(12) United States Patent
Wang

(10) Patent No.: US 11,864,660 B1
(45) Date of Patent: Jan. 9, 2024

(54) ADJUSTABLE BRACKET FOR FURNITURE

(71) Applicant: Shenzhen Chuangboyou Technology Development Co., LTD, Shenzhen (CN)

(72) Inventor: Lili Wang, Shenzhen (CN)

( * ) Notice: Subject to any disclaimer, the term of this patent is extended or adjusted under 35 U.S.C. 154(b) by 0 days.

(21) Appl. No.: 18/446,667

(22) Filed: Aug. 9, 2023

(30) Foreign Application Priority Data

Jun. 16, 2023 (CN) .......................... 202310725417.3

(51) Int. Cl.
| | |
|---|---|
| *A47C 4/28* | (2006.01) |
| *A47C 4/34* | (2006.01) |
| *A47C 4/44* | (2006.01) |
| *A47C 3/00* | (2006.01) |
| *A47C 7/00* | (2006.01) |
| *F16M 11/24* | (2006.01) |
| *A47B 3/00* | (2006.01) |
| *A47C 3/36* | (2006.01) |
| *A47B 3/08* | (2006.01) |
| *F41A 23/14* | (2006.01) |

(52) U.S. Cl.
CPC .............. *A47C 7/002* (2013.01); *A47B 3/002* (2013.01); *A47B 3/08* (2013.01); *A47B 3/0803* (2013.01); *A47C 3/36* (2013.01); *A47C 4/28* (2013.01); *A47C 4/286* (2013.01); *A47C 4/34* (2013.01); *A47C 4/44* (2013.01); *F16M 11/242* (2013.01); *F16M 11/245* (2013.01); *F16M 11/247* (2013.01); *F41A 23/14* (2013.01); *A47B 2003/004* (2013.01)

(58) Field of Classification Search
CPC .. A47C 7/002; A47C 3/36; A47C 4/28; A47C 4/286; A47C 4/34; A47C 4/44; A47C 4/30; A47B 3/002; A47B 3/08; A47B 3/0803; A47B 2003/004; F41A 23/14; F16M 11/242; F16M 11/245; F16M 11/247; B25H 1/04
USPC ......... 248/163.1, 164, 166, 168, 188.7, 440, 248/440.1; 108/128
See application file for complete search history.

(56) References Cited

U.S. PATENT DOCUMENTS

| | | | |
|---|---|---|---|
| 10,010,179 B1 * | 7/2018 | Stump ...................... | A47C 4/44 |
| 11,439,238 B1 * | 9/2022 | Wang ...................... | A47C 4/286 |
| 2021/0317942 A1 * | 10/2021 | Mendo ................... | F16M 11/16 |
| 2022/0386779 A1 * | 12/2022 | Garcia ................... | A47C 4/286 |

(Continued)

FOREIGN PATENT DOCUMENTS

CN 219249626 U * 6/2023 ............. A47C 4/286

*Primary Examiner* — Robert Canfield

(57) ABSTRACT

The present disclosure provides an adjustable bracket for furniture, including a base and multiple support members movably connected to the base; the base includes a lower portion and an upper portion, and the multiple support members include three or more lower support members; the lower portion includes a lower receiving portion configured to receive the lower support members, a screw, and a knob; each lower support member includes a leg and a connection portion disposed proximate to the lower receiving portion; the connection portion includes a first elastic member connected to the lower receiving portion and an end portion away from the mounting surface; the end portion abuts against the upper portion when the legs are in a folded position, and the end portion is tangent to the nut and a tangent point to the nut is changeable when the legs are in an unfolded position.

7 Claims, 4 Drawing Sheets

(56) References Cited

U.S. PATENT DOCUMENTS

| | | | |
|---|---|---|---|
| 2023/0023969 A1* | 1/2023 | Zhu | A47C 4/286 |
| 2023/0200539 A1* | 6/2023 | Chen | A47C 3/18 |
| | | | 297/47 |

* cited by examiner

ADJUSTABLE BRACKET FOR FURNITURE

CROSS REFERENCE

The present disclosure claims priority of Chinese Patent Application No. 202310725417.3, filed on Jun. 16, 2023, the entire contents of which are hereby incorporated by reference in their entirety.

TECHNICAL FIELD

The present disclosure relates to technical field of leisure goods, especially relates to an adjustable bracket for furniture.

BACKGROUND

With the development of the economy, urban people often choose to go out of their homes to relax and enjoy the outdoor life.

For outdoor activities, such as fishing, camping, etc., portable tables and chairs and other furniture are usually required. However, the common portable tables and chairs only have the function of foldability, with a single way of use and lack of adaptability and interestingness to different needs.

SUMMARY OF THE DISCLOSURE

Based on this, it is necessary to propose an adjustable bracket for furniture to solve the problem of using portable furniture in a single way.

The present disclosure provides an adjustable bracket for furniture, including a base and multiple support members movably connected to the base; the base includes a lower portion and an upper portion sleeved on the lower portion, and the multiple support members include three or more lower support members pivotally connected to the lower portion; the lower portion includes a lower receiving portion configured to receive the three or more lower support members and enclose a central channel, a screw passing through the central channel, and a knob disposed at a lower end of the screw; a sidewall of the central channel is arranged with threads that correspond to the screw, and the screw includes a hemispherical nut away from the knob; each lower support member includes a leg to be arranged on a mounting surface and a connection portion disposed proximate to the lower receiving portion; the connection portion includes a first elastic member connected to the lower receiving portion and an end portion away from the mounting surface; the end portion abuts against an inner sidewall of the upper portion when the leg is in a folded position, and the end portion is tangent to the nut and a tangent point to the nut is changeable under an action of the knob when the leg is in an unfolded position.

In some embodiments, an end of the leg away from the mounting surface is arranged with a tooth portion, and the tooth portions of the legs are engaged to achieve linkage.

In some embodiments, the lower receiving portion defines a mounting hole, and the first elastic member is a torsion spring with an end fixed to the mounting hole and the other end fixed to an end of the connection portion away from the lower receiving portion.

In some embodiments, the support member further includes three or more upper support members movably connected to the upper portion.

In some embodiments, the upper portion includes a center shaft portion, an upper receiving portion disposed around the center shaft portion for receiving the three or more upper support members, and a top cover fixed to a top end of the center shaft portion and covering the upper receiving portion; a second elastic member and a third elastic member are arranged at upper and lower intervals between the center shaft portion and the upper receiving portion; when the upper receiving portion rotates with the center shaft portion as an axis, the upper receiving portion is reset under an action of the second elastic member or the third elastic member.

In some embodiments, the second elastic member is a torsion spring with an end abutting against the top cover and the other end abutting against the upper receiving portion, and the third elastic member is a torsion spring with an end abutting against the center shaft portion and the other end abutting against the upper receiving portion.

In some embodiments, each upper support member is a telescopic rod with an end pivoted to the upper receiving portion.

The present disclosure provides an adjustable bracket for furniture, including a base and multiple support members movably connected to the base; the base includes a lower portion and an upper portion sleeved on the lower portion, and the multiple support members include three or more lower support members pivotally connected to the lower portion; the lower portion includes a lower receiving portion configured to receive the three or more lower support members and enclose a central channel, a screw passing through the central channel, and a knob disposed at a lower end of the screw; a sidewall of the central channel is arranged with threads that correspond to the screw, and the screw includes a hemispherical nut away from the knob; each lower support member includes a leg to be arranged on a mounting surface and a connection portion disposed proximate to the lower receiving portion; the connection portion includes a first elastic member connected to the lower receiving portion and an end portion away from the mounting surface; the end portion abuts against an inner sidewall of the upper portion when the legs are in a folded position, and the end portion is tangent to the nut and a tangent point to the nut is changeable under an action of the knob when the legs are in an unfolded position. The adjustable bracket for furniture provided by the present disclosure can smoothly change the angle of deployment of the legs by changing the tangent point between the end portion and the nut by means of the knob, thereby achieving the purpose of adjusting the height of the base with respect to the mounting surface.

BRIEF DESCRIPTION OF THE DRAWINGS

In order to more clearly illustrate the technical solutions in the specific embodiments or related art of the present disclosure, the accompanying drawings to be used in the description of the specific embodiments or related art will be briefly introduced below. It will be obvious that the accompanying drawings in the following description are some of the embodiments of the present disclosure, and that for those skilled in the art, other attachments can be obtained based on these accompanying drawings without putting in creative labor.

DETAILED DESCRIPTION

Figure 1:
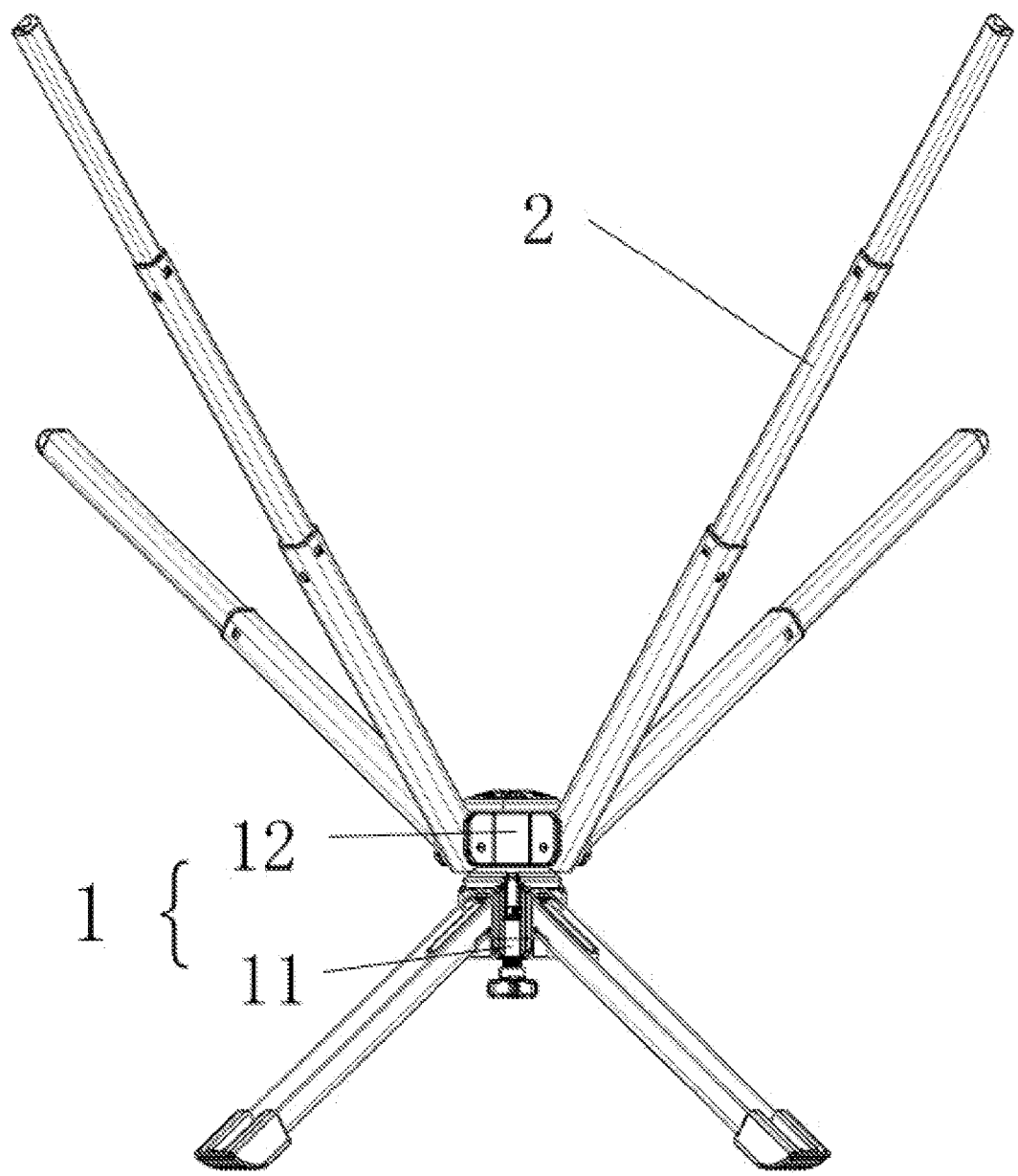
FIG. 1 is an assembled structural schematic view of an adjustable bracket for furniture according to an embodiment of the present disclosure.
Figure 2:
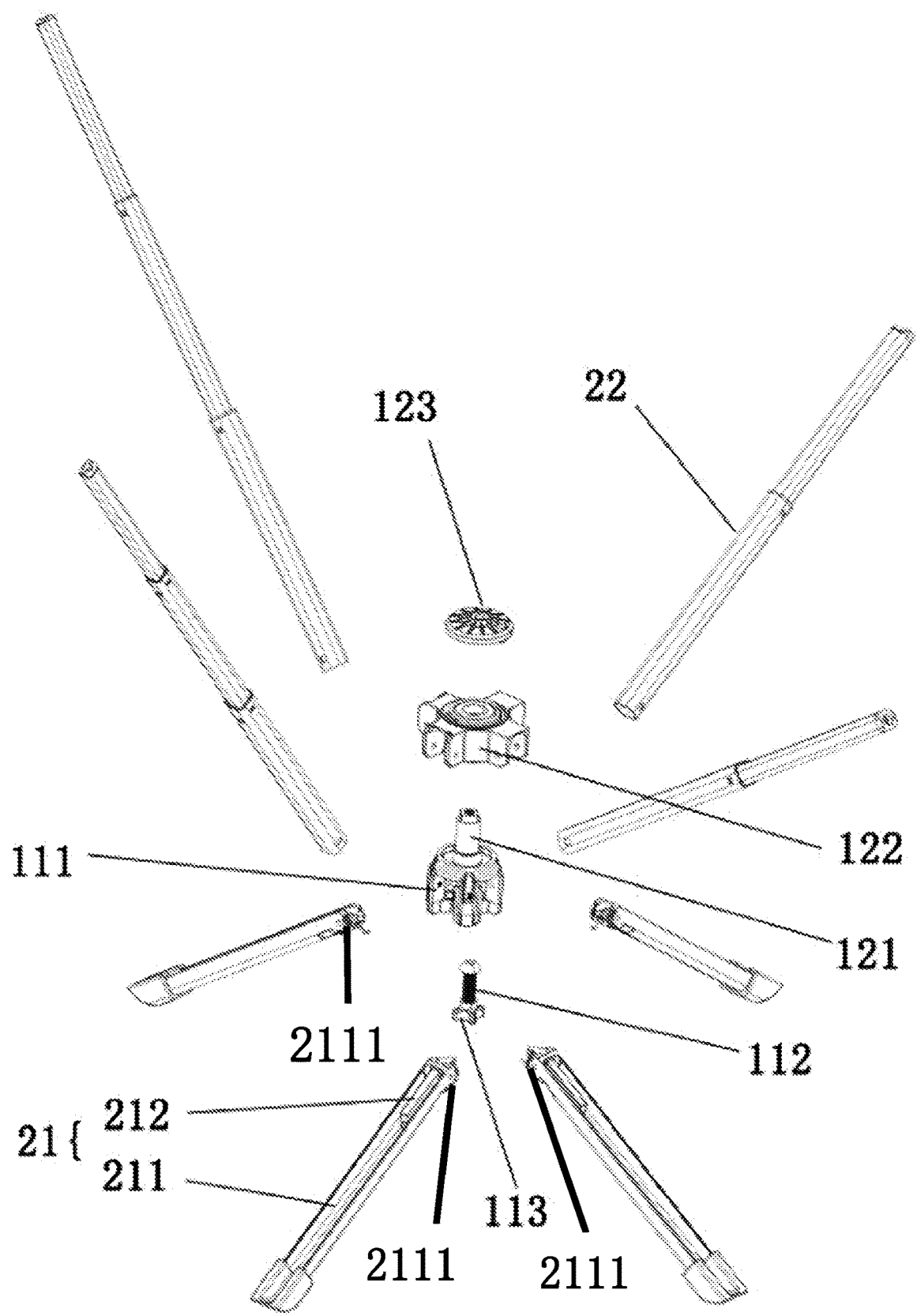
FIG. 2 is a disassembled structural schematic view of an adjustable bracket for furniture according to an embodiment of the present disclosure.
Figure 3:
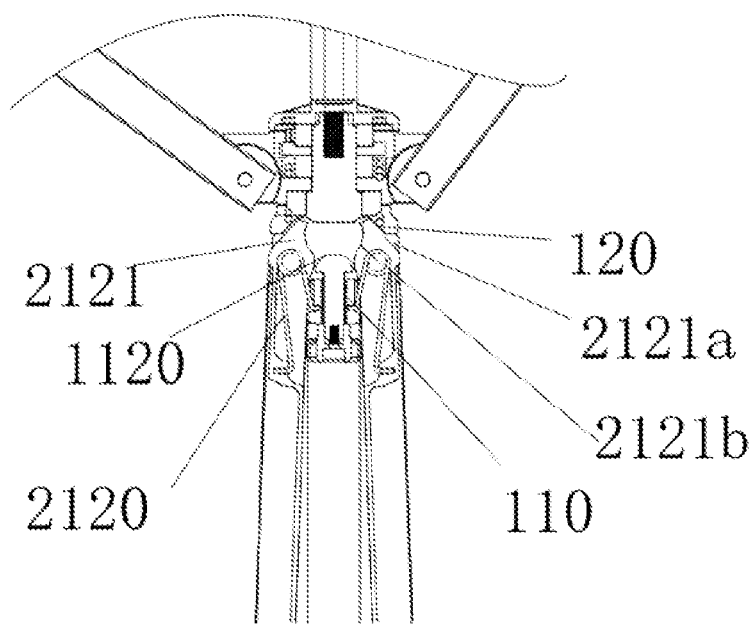
FIG. 3 is a cross-sectional view of an adjustable bracket for furniture in a folded state according to an embodiment of the present disclosure.

The following will be a clear and complete description of the technical solutions in the embodiments of the present disclosure in conjunction with the accompanying drawings in the embodiments of the present disclosure. Obviously, the described embodiments are only a part of the embodiments of the present disclosure, and not all of them. Based on the embodiments in the present disclosure, all other embodiments obtained by those skilled in the art without creative labor fall within the scope of the present disclosure.

In the description of the present disclosure, it is noted that when the terms "center", "up", "down", "left", "right", "vertical", "horizontal", "inner", "outer", etc. appear, they are indicative of an orientation or positional relationship based on that shown in the accompanying drawings, which is intended only to facilitate and simplify the description of the present disclosure and is not indicative of, or suggestive of, the necessity for the device or element referred to be of a particular orientation, or to be constructed and operated in a particular orientation, and therefore is not to be construed as a limitation of the present disclosure. Furthermore, the terms "first", "second", "third", if present, are used for descriptive purposes only and are not to be understood as indicating or implying relative importance.

Referring to FIGS. 1-FIG. 5, the present disclosure provides an adjustable bracket 100 for furniture, including a base 1 and multiple support members 2 movably connected to the base 1; the base 1 includes a lower portion 11 and an upper portion 12 sleeved on the lower portion 11, and the multiple support members 2 include three or more lower support members 21 pivotally connected to the lower portion 11.

Specifically, the lower portion 11 includes: a lower receiving portion 111 configured to receive the three or more lower support members 21 and enclose a central channel 110, a screw 112 passing through the central channel 110, and a knob 113 disposed at a lower end of the screw 112; a sidewall of the central channel 110 is arranged with threads that correspond to the screw 112, and the screw 112 includes a hemispherical nut 1120 away from the knob 113.

Each lower support member 21 includes a leg 211 to be arranged on a mounting surface (e.g., a floor) and a connection portion 212 disposed proximate to the lower receiving portion 111; the connection portion 212 includes a first elastic member 2120 connected to the lower receiving portion 111 and an end portion 2121 away from the mounting surface. In the embodiments, the lower receiving portion 111 defines a mounting hole (not labeled), and the first elastic member 2120 is a torsion spring with an end fixed to the mounting hole and the other end fixed to an end of the connection portion 212 away from the lower receiving portion 111. It can be understood that in other embodiments, other elastic elements such as a shrapnel may replace the torsion spring.

Figure 4:
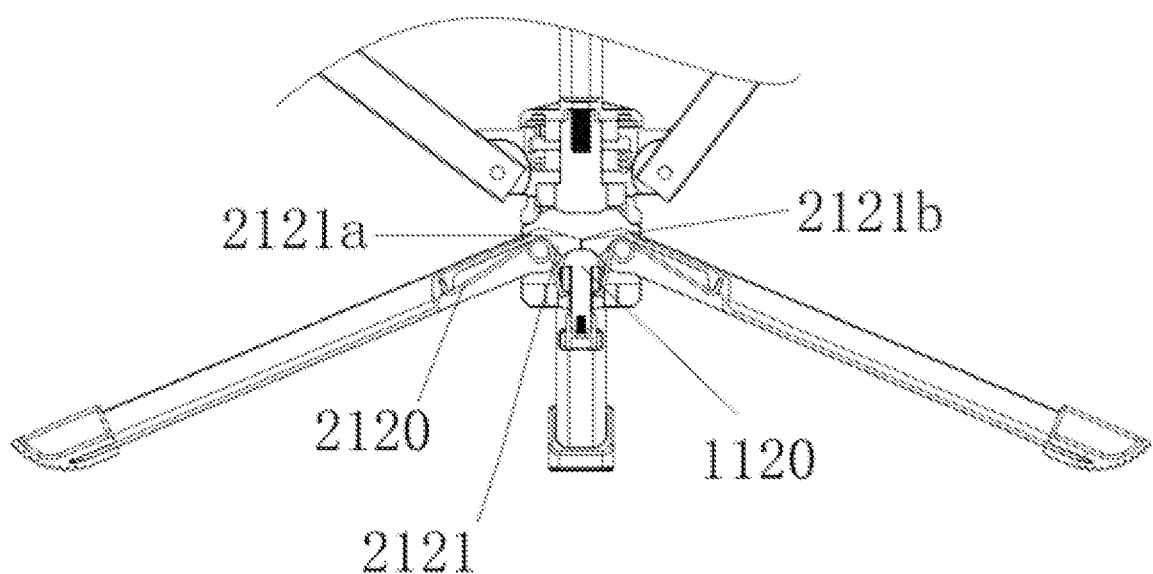
FIG. 4 is a cross-sectional view of an adjustable bracket for furniture in an unfolded state according to an embodiment of the present disclosure.
Figure 5:
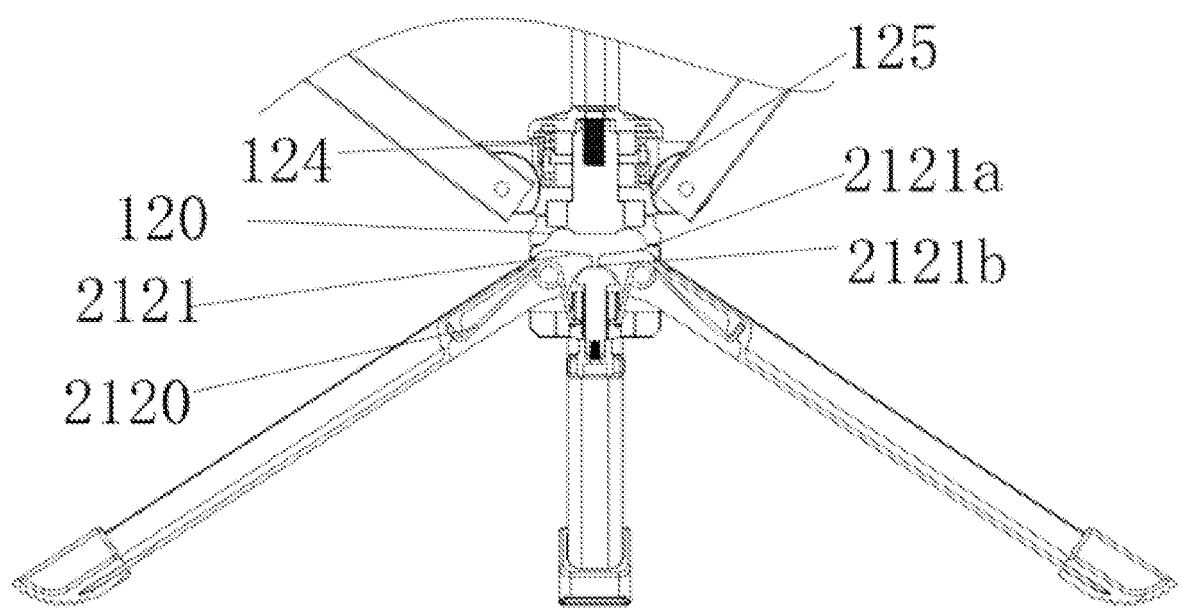
FIG. 5 is a cross-sectional view of an adjustable bracket for furniture in another unfolded state according to an embodiment of the present disclosure.

When the legs 211 are in a retracted (folded) position, the end portion 2121 abuts against an inner sidewall 120 of the upper portion 12. When the legs 211 are in an unfolded position, the end portion 2121 is tangent to the nut 1120, and a tangent point to the nut 1120 may be changed under an action of the knob 113. Specifically, when the legs 211 are in the folded position, the legs 211 are substantially parallel, and a first surface 2121a of the end portion 2121 abuts against the inner sidewall 120 of the upper portion 12. In this case, when the legs 211 are unfolded, each leg 211 rotates with the lower receiving portion 111 as an axis under the action of the first elastic member 2120, the ends of the multiple legs 211 to be in contact with the mounting surface are far away from each other, the first surface 2121a of the end portion 2121 leaves the inner sidewall 120 of the upper portion 12, and a second surface 2121b of the end portion 2121 moves downwardly until it is tangent to the nut 1120, in which case the legs 211 reach the unfolded position. By rotating the knob 113 arranged at the lower end of the screw 112, the screw 112 can move upwardly or downwardly within the center channel 110, driving the nut 1120 to move upwardly or downwardly. When the nut 1120 moves, the tangent point between the second surface 2121b of the end portion 2121 and the nut 1120 changes accordingly. Specifically, as shown in FIG. 4, when the nut 1120 moves to a lowest point, the tangent point between the second surface 2121b and the nut 1120 is closest to a central axis of the central channel 110, in which case the angle at which the legs 211 are unfolded is the greatest, and the distance between the lower portion 11 and the mounting surface is the least, such that the height of the bracket 100 can be adjusted to the lowest. As shown in FIG. 5, when the knob 113 is rotated such that the nut 1120 is gradually raised from the lowest point, the tangent point between the second surface 2121b and the nut 1120 gradually moves in a direction away from the central axis of the central channel 110, in which case the angle at which the legs 211 are unfolded gradually decreases, and the distance between the lower portion 11 and the mounting surface gradually increases, such that the height of the adjustable bracket 100 is gradually increased. It can be understood that when the height of the adjustable bracket 100 is to be lowered, the knob 113 is rotated in the reverse direction, such that the nut 1120 can be lowered, the tangent point between the second surface 2121b and the nut 1120 is gradually moved in a direction close to the central axis of the central channel 110, and the angle at which the legs 211 are unfolded is gradually increased.

By changing the tangent point between the end portion 113 and the nut by the knob, the angle at which the legs 211 are unfolded can be smoothly changed, thereby achieving the purpose of adjusting the height of the base 1 with respect to the mounting surface, and thus changing the height of the adjustable bracket 100.

In some embodiments, an end of the leg 211 away from the mounting surface is arranged with a tooth portion 2111, and the tooth portions 2111 of the multiple legs 211 are engaged to achieve linkage, which facilitates unfolding or folding the legs 211.

Further, the support member 2 may further includes three or more upper support members 22 movably connected to the upper portion 12. The upper portion 12 includes a center shaft portion 121, an upper receiving portion 122 disposed around the center shaft portion 121 for receiving the three or more upper support members 22, and a top cover 123 fixed to a top end of the center shaft portion 121 and covering the upper receiving portion 122.

As shown in FIG. 5, a second elastic member 124 and a third elastic member 125 are arranged at upper and lower intervals between the center shaft portion 121 and the upper receiving portion 122, such that when the upper receiving portion 122 rotates with the center shaft portion 121 as an axis, the upper receiving portion 122 is reset under an action of the second elastic member 124 or the third elastic member 125. Specifically, the second elastic member 124 is a torsion spring with an end abutting against the top cover 123 and the other end abutting against the upper receiving portion 122, and the third elastic member 125 is a torsion spring with an end abutting against the center shaft portion 121 and the other end abutting against the upper receiving portion 122. When the upper receiving portion 122 rotates in a direction with the center shaft portion 121 as the axis, the second elastic member 124 is stressed to spring back, causing the upper receiving portion 122 to return to an initial position; when the upper receiving portion 122 rotates in the other direction with the center shaft portion 121 as the axis, the third elastic member 125 is stressed to spring back, causing the upper receiving portion 122 to return to the initial position. In this way, the upper portion 12 can be reset when rotating to the left or right, increasing the interestingness of the adjustable bracket 100.

In some embodiments, the upper support member 22 is a telescopic rod with an end pivoted to the upper receiving portion 122, and the upper support member 22 can rotate with the upper receiving portion 122 as an axis, such that when the upper support member 22 rotates to above the upper receiving portion 122 and a tablecloth or a seatcloth is installed on an end of the upper support member 22 that is away from the upper receiving portion 122, the adjustable bracket 100 can be used as a portable table or a portable chair. It will be appreciated that the lengths of the multiple upper support members 22 may be consistent or inconsistent. For example, when the lengths of the multiple upper support members 22 are consistent, the adjustable bracket 100 can be used as a stand for a table or a stool; when the lengths of the multiple upper support members 22 are inconsistent, the adjustable bracket 100 can be used as a stand for a chair or a hammock. In other embodiments, the upper support member 22 may not be a telescopic rod, but rather single or multiple section tubes pivoted or detachably connected to the upper receiving portion 122.

The present disclosure provides an adjustable bracket for furniture, including a base and multiple support members movably connected to the base; the base includes a lower portion and an upper portion sleeved on the lower portion, and the multiple support members include three or more lower support members pivotally connected to the lower portion; the lower portion includes a lower receiving portion configured to receive the three or more lower support members and enclose a central channel, a screw passing through the central channel, and a knob disposed at a lower end of the screw; a sidewall of the central channel is arranged with threads that correspond to the screw, and the screw includes a hemispherical nut away from the knob; each lower support member includes a leg to be arranged on a mounting surface and a connection portion disposed proximate to the lower receiving portion; the connection portion includes a first elastic member connected to the lower receiving portion and an end portion away from the mounting surface; the end portion abuts against an inner sidewall of the upper portion when the legs are in a folded position, and the end portion is tangent to the nut and a tangent point to the nut is changeable under an action of the knob when the legs are in an unfolded position. The adjustable bracket for furniture provided by the present disclosure can smoothly change the angle of deployment of the legs by changing the tangent point between the end portion and the nut by means of the knob, thereby achieving the purpose of adjusting the height of the base with respect to the mounting surface.

The above embodiments are only intended to illustrate the technical solution of the present disclosure, not to limit it; although the present disclosure has been described in detail with reference to the foregoing embodiments, those skilled in the art should understand that it is still possible to modify the technical solution recorded in the foregoing embodiments, or to replace some or all of the technical features with equivalent ones; and these modifications or replacements do not make the corresponding technical solution deviate from the essence of the technical solution of the present disclosure.

What is claimed is:

1. An adjustable bracket for furniture, comprising a base and a plurality of support members movably connected to the base;
    wherein the base comprises a lower portion and an upper portion sleeved on the lower portion, and the plurality of support members comprise three or more lower support members pivotally connected to the lower portion;
    the lower portion comprises a lower receiving portion configured to receive the three or more lower support members and enclose a central channel, a screw passing through the central channel, and a knob disposed at a lower end of the screw; wherein a sidewall of the central channel is arranged with threads that correspond to the screw, and the screw comprises a nut in a hemispherical shape away from the knob;
    each lower support member comprises a leg to be arranged on a mounting surface and a connection portion disposed proximate to the lower receiving portion; the connection portion comprises a first elastic member connected to the lower receiving portion and an end portion away from the mounting surface; the end portion abuts against an inner sidewall of the upper portion when the leg is in a folded position, and the end portion is tangent to the nut and a tangent point to the nut is changeable under an action of the knob when the leg is in an unfolded position.

2. The adjustable bracket for furniture according to claim 1, wherein an end of the leg away from the mounting surface is arranged with a tooth portion, and the tooth portions of the legs are engaged to achieve linkage.

3. The adjustable bracket for furniture according to claim 1, wherein the lower receiving portion defines a mounting hole, and the first elastic member is a torsion spring with an end fixed to the mounting hole and the other end fixed to an end of the connection portion away from the lower receiving portion.

4. The adjustable bracket for furniture according to claim 1, wherein the plurality of support members further comprises three or more upper support members movably connected to the upper portion.

5. The adjustable bracket for furniture according to claim 4, wherein the upper portion comprises a center shaft portion, an upper receiving portion disposed around the center shaft portion for receiving the three or more upper support members, and a top cover fixed to a top end of the center shaft portion and covering the upper receiving portion;

a second elastic member and a third elastic member are arranged at upper and lower intervals between the center shaft portion and the upper receiving portion; when the upper receiving portion rotates with the center shaft portion as an axis, the upper receiving portion is reset under an action of the second elastic member or the third elastic member.

6. The adjustable bracket for furniture according to claim 5, wherein the second elastic member is a torsion spring with an end abutting against the top cover and the other end abutting against the upper receiving portion, and the third elastic member is a torsion spring with an end abutting against the center shaft portion and the other end abutting against the upper receiving portion.

7. The adjustable bracket for furniture according to claim 4, wherein each upper support member is a telescopic rod with an end pivoted to the upper receiving portion.

\* \* \* \* \*